United States Patent [19]

Dubroeucq et al.

[11] Patent Number: 4,728,187
[45] Date of Patent: Mar. 1, 1988

[54] METHOD FOR THE RECIPROCAL POSITIONING OF AN OPTICAL FIBER AND A SEMICONDUCTOR LASER AND A POSITIONING APPARATUS USING THIS METHOD

[75] Inventors: Georges Dubroeucq, Enghein les Bains; Frantz Martin, Les Ulis; Michel Georgeot, Orsay; Thierry Chamfrault, Ste Gennevieve des Bois, all of France

[73] Assignee: Thomson-CSF, Paris, France

[21] Appl. No.: 939,115

[22] Filed: Dec. 8, 1986

[30] Foreign Application Priority Data

Dec. 10, 1985 [FR] France ................... 85 18256

[51] Int. Cl.[4] .............................................. G01B 11/26
[52] U.S. Cl. ...................................... 356/153; 356/400
[58] Field of Search ............... 356/138, 153, 375, 399, 356/400

[56] References Cited

U.S. PATENT DOCUMENTS 4,474,469 10/1984 Abe ..................... 356/153 X
4,664,732 5/1987 Campbell et al. ............. 356/400 X
4,673,290 6/1987 Johnson et al. ............... 356/153 X

FOREIGN PATENT DOCUMENTS 2065918 7/1981 United Kingdom .

OTHER PUBLICATIONS

Patents Abstracts of Japan, vol. 9, No. 93 (P-351) [1816], 23 Apr. 1985 & JP A 59 219 707 (Fujikura Densen K.K.).
Patents Abstracts of Japan, vol. 8, No. 165 (P-291) [1602], 31 Jul. 1984 & JP A 59 61 809 (Fujitsu K.K.).
Xerox Disclosure Journal, vol. 4, No. 3, May/Jun. 1979, pp. 387-388; M. D. Bailey et al.

*Primary Examiner*—Eugene R. LaRoche
*Assistant Examiner*—David Mis
*Attorney, Agent, or Firm*—Oblon, Fisher, Spivak, McClelland & Maier

[57] ABSTRACT

The invention provides a method and apparatus for aligning an optical fiber and a semiconductor laser. The positions of the laser and of the fiber are located with respect to a fixed reference system, which is an optical detector which identifies the transverse light emission of the laser. With the laser position, the fiber is advanced so that it "flies over" the laser: the fiber then modulates the light received by the detector of the reference system. The fiber is moved back by a known amount and is moved by scanning in the plane transversal to the emissive axis of the laser, until a second optical detector, placed at the other end of the fiber, receives a maximum of light transmitted by the fiber.

8 Claims, 11 Drawing Figures

U.S. Patent  Mar. 1, 1988  Sheet 1 of 3  4,728,187
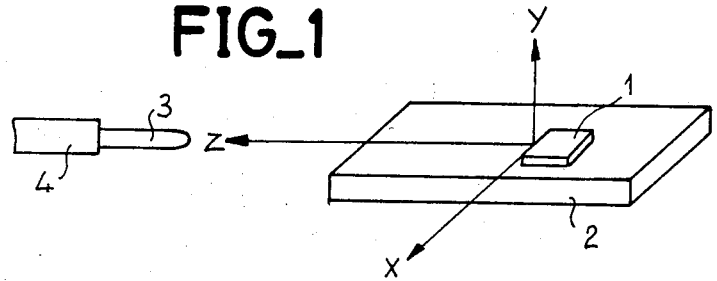
FIG_1
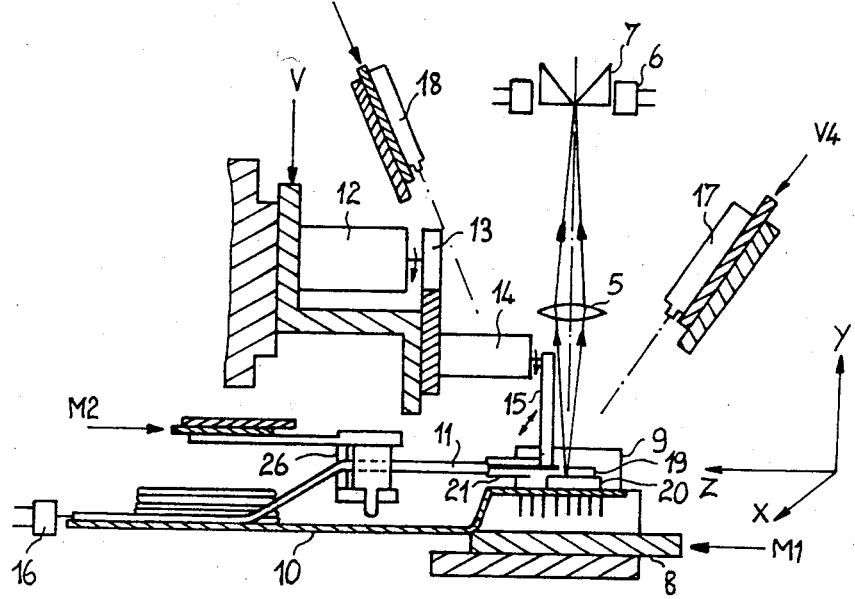
FIG_2
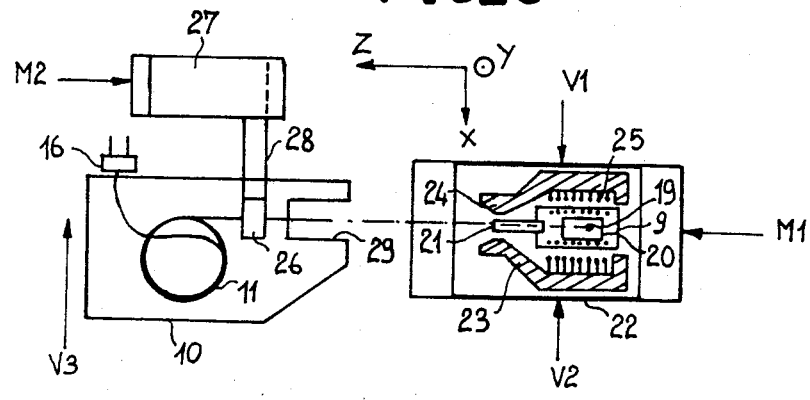
FIG_3

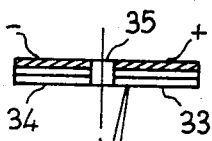
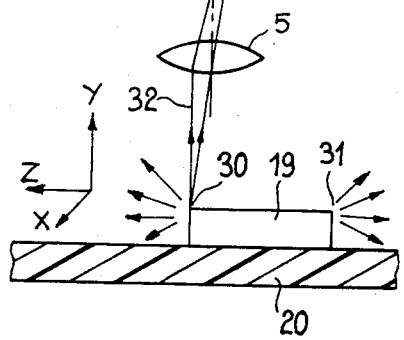
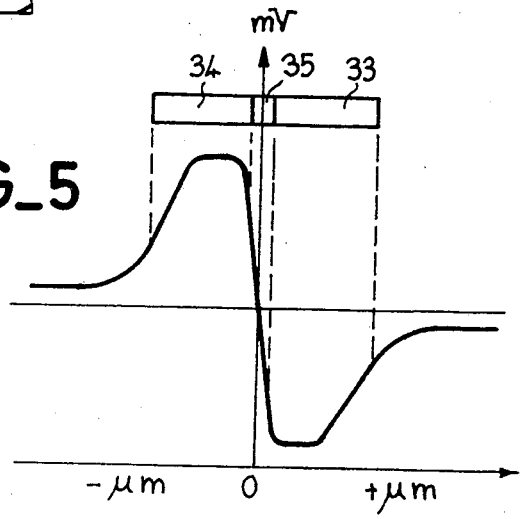
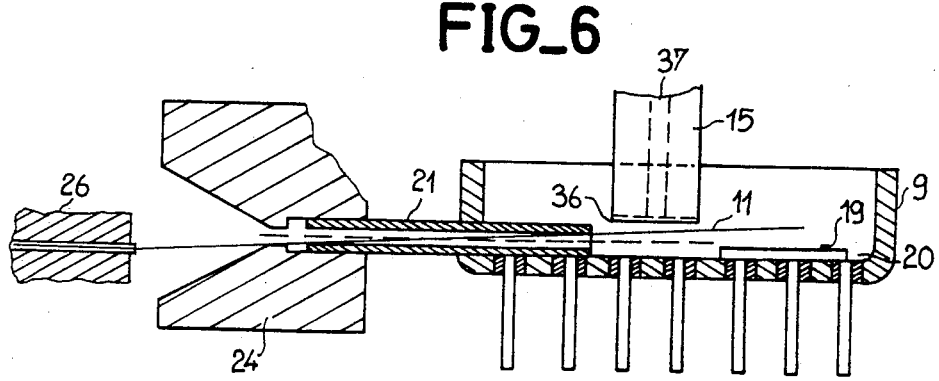

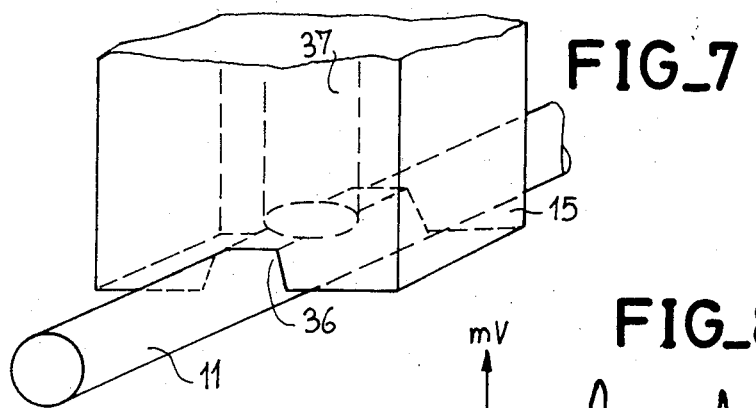
FIG_7
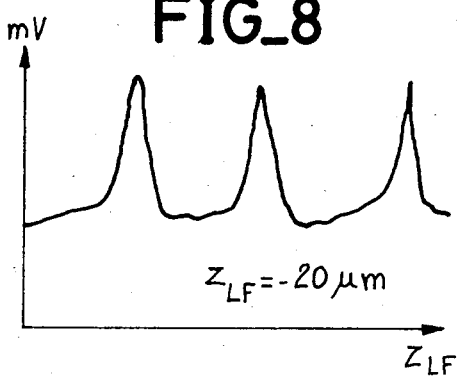
FIG_8
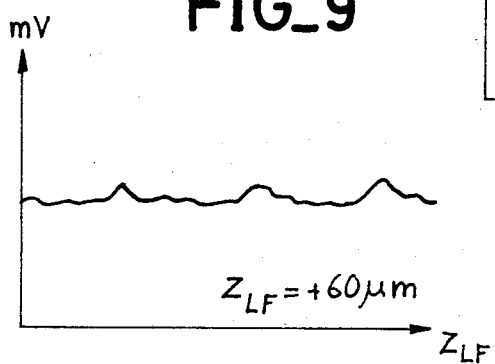
FIG_9
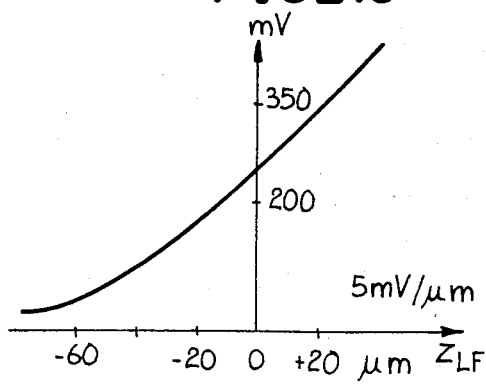
FIG_10
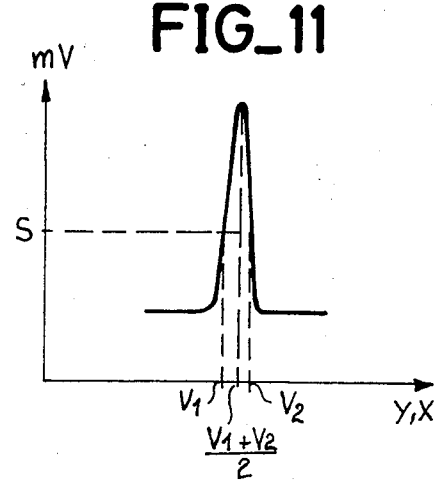
FIG_11

METHOD FOR THE RECIPROCAL POSITIONING OF AN OPTICAL FIBER AND A SEMICONDUCTOR LASER AND A POSITIONING APPARATUS USING THIS METHOD

BACKGROUND OF THE INVENTION

The present invention relates to a method for the reciprocal positioning of an optical fiber and a semicondutor component emitting light radiation, so as to form a so called "optical head" assembly, in which the optical fiber and the opto-electronic component are coupled in their optimum position, and integrated with a chip carrier which immobilizes them and protects them. The invention also relates to the apparatus for adjusting the position of the optical fiber with respect to the emissive region of the opto-electronic component, in accordance with the method.

Optical heads associating an opto-electronic component and an optical fiber form an important point in all optical fiber data processing and data transmission systems. The optical fibers can only convey information if it is emitted by components which, at the present time, are light emitting diodes or lasers. But, because of the very small dimensions of the diodes and of the lasers, on the one hand, and of the optical fibers on the other, having a core diameter of 70 microns for a multimode fiber and of 29 microns for a monomode fiber, the fiber must be positioned with an accuracy of the order of 0.5 to 10 microns with respect to the light beam emitted, in a plane perpendicular to this beam.

Positioning of an optical fiber is then a delicate operation, which is therefore long and whose price is a burden on the development of optical heads and consequently data transmission by optical fibers. It is then an object of the invention to provide a method for the relative optical fiber-optoelectronic component positioning adapted to complete automation.

Another object of the invention is to provide an apparatus using this positioning method which, supplied with optical fibers and opto-electronic components, ensures the reciprocal positioning, the fixing of the parts and delivers optical heads coupled to the maximum efficiency.

In order to simplify the explanations and the Figures, the invention will be described with reference to the case of an optical fiber and a laser mounted in a DIL (dual in line) type carrier, because this carrier is current, economic and as long as it is not closed by a cover allows the position of the laser to be located.

SUMMARY OF THE INVENTION

The method of the invention consists first of all in locating the position of the front emissive face of the laser, with respect to a fixed reference frame. For that, the spontaneous energy radiated by the laser source in a direction perpendicular to the emission axis is used as position signal with respect to a differential detector, difference measuring diode or twin faced diode, on which said spontaneous energy is focused by an optical image forming system. The differential detector materializes the fixed reference frame.

The optical fiber is then moved between the laser and the optical image forming system until it "overflies" the laser. In this position in which it is too advanced with respect to the laser, it modulates the light emitted by this latter from the moment when it passes above the emission point of the laser. The emissive face of the laser and the end of the optical fiber are then located with respect to a fixed reference frame.

The optical fiber is moved back by a precisely known amount, so as to create a distance between the active phase of the laser and the end of the optical fiber, and it is brought close to the emission axis of the laser, in a double vertical and horizontal scanning movement. The acquisition of information indicating that the optical fiber transmits the light emitted by the laser and the optimum coupling position are controlled by a receiving diode which, placed at the other end of the optical fiber, picks up the light emitted by the laser. The coupling is optimum in a plane perpendicular to the emission axis of the laser, or transverse plane, when the energy detected by the receiving diode is maximum.

The coupling is optimized by a longitudinal movement of the optical fiber along the emission axis of the laser, without modifying its transverse position.

When the optimum coupling is reached, the optical fiber is bonded to the ceramic which supports the laser chip, and its sheath is bonded to the carrier of the optical head, by means of a passage provided for this purpose in the wall of the carrier.

The optical head formed is optimized.

The positioning apparatus of the invention includes the means for putting into practice the method which has just been described. It includes, supported by a rigid frame:

means materializing a fixed reference frame formed by an optical image forming system and a differential optical detector.

means for positioning an opto-electronic component fixed in a carrier without cover, said means allowing the opto-electronic component to be moved along its light emission axis as far as the origin of the fixed reference frame, means for positioning an optical fiber, said means allowing the end of the optical fiber to be moved along three axes in space, means for recognizing the position of the optical fiber with respect to the opto-electronic component, formed by the differential optical detector for position location with respect to the light emission axis, and by a detecting diode, situated at the other end of the fiber, for position location in a transverse plane with respect to the light emission axis, means for acquiring the electric data of the diodes and for actuating the positioning means, means for bonding the optical fiber to the carrier of the opto-electronic component.

More precisely, the invention provides a method for the reciprocal positioning of an optical fiber and a semiconductor laser, the laser chip being mounted in a chip carrier without cover and the fibers substantially parallel to the emissive axis of the laser being introduced into the carrier through one of its walls, this method being characterized in that the laser and the fiber are located with respect to a fixed reference frame formed by the optical axis common to an optical image forming device and a differential optical detector which picks up the energy radiated by the laser in a direction perpendicular to the emission axis of the laser.

BRIEF DESCRIPTION OF THE DRAWINGS

The invention will be better understood from the description of one embodiment of the apparatus and the more detailed description of the method for positioning a fiber with respect to a laser, these descriptions referring to the accompanying Figures which all relate to the invention:

FIG. 1: convention for locating an optical fiber and an opto-electronic component, FIG. 2: general diagram of a positioning apparatus, FIG. 3: simplified top view of the devices supporting the optical fiber and the laser, FIG. 4: diagram of positioning the laser with respect to a fixed reference frame, FIG. 5: form of the electric signal delivered by the differential detector during movement of the laser, FIG. 6: partial sectional view of the optical head carrier, showing introduction of the fiber in the carrier and manipulation thereof with respect to the laser, FIG. 7: a three quarters view in space of the end of the manipulation pipette, FIGS. 8 and 9: modulation of the electric signal on the differential detector as a function of the distance of the optical fiber from the emissive face of the laser, when the fiber overflies the laser (FIG. 8) and when the fiber is correctly spaced from the emissive space (FIG. 9), FIG. 10: modulation emplitude of the electric signal as a function of the optical fiber/laser distance, and FIG. 11: form of the electric signal detected by the receiving diode, as a function of the position of the optical fiber in a transverse plane with respect to the emission axis of the laser.

DESCRIPTION OF THE PREFERRED EMBODIMENT

In order to form optical heads from fibers, an optical fiber must be positioned with an accuracy of the order of a micron or less than a micron with respect to the emissive face of a semiconductor laser, and this position must be held during the phase of immobilizing the fiber by bonding or by welding. This then requires locating the respective positions of the emissive face of a semiconductor laser and the end of an optical fiber which must be coupled thereto, which consequently requires having a fixed reference system.

The basis of the method used in the apparatus of the present invention consists in using the spontaneous energy radiated by the laser source in a direction perpendicular to the emission axis, as position signal of the laser with respect to a fixed reference system.

In order to clarify the expressions and the Figures in the rest of the text, FIG. 1 shows the convention adopted for designating the movements in space of the optical fiber and of the semiconductor wafer. The semiconductor laser wafer 1 being fixed on a ceramic base 2, itself fixed inside a case which is not shown in this Figure, the laser 1 emits main light radiation in a direction which will be caled conventionally the Z axis, with which the end 3 of the optical fiber, leaving sheath 4, must be aligned and positioned. For the convenience of working and for the construction of an optical head, this Z axis is in a horizontal plane. In a vertical plane passing through the emissive face of the laser wafer are defined two other axes x in the horiontal plane and Y in the vertical plane. The assembly of axes X, Y and Z defines then a dihedron in space.

It is by moving the optical fiber first of all along the Z axis, then by a sweep along Y and X that its end is coupled in an optical position with respect to the laser wafer.

FIG. 2 shows a simplified diagram of the apparatus for the reciprocal positioning of an optical fiber with respect to a laser, the description of which will better show the method of centering the core of the optical fiber with respect to the beam emitted by the laser.

The positioning apparatus of the invention includes, fixed to a rigid frame so that the accuracy of the movements are less than a micron, first of all a fixed reference system with respect to which the laser on the one hand, and the end of the optical fiber on the other will be positioned. This reference system is formed by image forming optics 5, which is a microscope objective whose magnification is of the order of 20, chosen so as to have sufficient search dynamics, of the order of 300 to 500 microns, without the beam emitted at the rear of the laser penetrating into the field of the optical system. This microscope objective is associated with a differential detector formed either by a diode with two faces, or by two diodes 6 onto which the light is reflected by two prisms 7. The optical axis of the fixed reference system formed by the objective 5 and the differential detector 6–7 constitutes the axis Y in the above defined reference trihedron.

The positioning apparatus of the invention also includes means 8 for supporting and moving a case 9 in which is fixed the wafer of the laser, as well as means 10 for supporting and moving the optical fiber 11. The laser wafer only moves with its support along the Z axis, until it is positioned at the origin with respect to the fixed reference system. Movement of the laser wafer is obtained by a rapid movement at the beginning, then improved by a slow movement, these two movements being created by a table mounted on bearings and by a motor actuating an endless screw, shown schematically by an arrow M.

For its part, the optical fiber moves along the three axes Z, X and Y of the reference trihedron, and this movement is obtained in a similar way first of all rapidly along Z then by means of a table mounted on bearings and then by an assembly of two apparatus called scanners since they allow the space XY to be scanned with an amplitude of the order of a millimeter.

The first scanner 12 is coupled to an excentric cam 13. Consequently, when scanner 12 starts to move, cam 13 acts on the support of a second scanner 14, which supports the end of the optical fiber by means of a pipette 15, by means of which the fiber is aspirated. The action of the first scanner 12 results then at the level of the end of the optical fiber by scanning or by a movement along Y, the action of the second scanner 14 results at the level of the optical fiber in a scanning along X.

Finally, the positioning apparatus of the invention includes a detection diode 16 which is coupled to the free end of the optical fiber: it is this diode which will allow the positioning of the optical fiber to be located with respect to the light beam emitted by the laser.

The apparatus also comprises a first bonding means 17, which is in the form of a syringe moved by an actuating cylinder identified at V4 and by a table mounted on bearings. With this syringe 17 the end of the optical fiber is fixed by means of a drop of adhesive to the ceramic which supports the laser wafer, when the fiber and the laser are correctly aligned. The apparatus also includes a second bonding means in the form of a second syringe 18, movable through an actuating cylinder V5 and a table mounted on bearings. With this second syringe the sheath of the optical fiber can be fixed by a drop of adhesive to a passage through the wall of case 9.

FIG. 3 shows a simplified top view of the two devices which support the optical fiber and the case in which the laser is fixed.

Inside an encapsulation case 9, of DIL type, the wafer 19 of the laser is fixed to a ceramic or beryllium oxide base 20. Case 9 includes a passage 21, which is a piece of tube fixed through the vertical wall of case 9 on the smaller side of its case which is opposite the wafer of the case. The case, which at that time does not yet have a cover, is positioned on a support 22 having two jaws 23 and 24. These jaws are themselves provided with spring contacts 25 which come to bear on the external connections of case 9 when the two jaws 23 and 24 are closed for immobilizing the case 9. Support 22 is moved by a motor M1 and the two jaws are actuated by two cylinders shown symbolically by V1 and V2.

In alignment with case 9 of the laser is provided a support 10 on which the optical fiber 11 is immobilized. One of the ends of this fiber, i.e. the one which is not aligned with the laser 19, is blocked facing a detection diode 16. The other end, which is to be aligned with the laser 19, is positioned by a pin 26 which, in the normal position, is removably secured to plate 10. A motor M2 driving a table mounted on bearings 27, having an arm 28, drives the pin 26 and thereby causes the optical fiber to move forward or backward along axis Z. A notch 29 formed in the support 10 of the optical fiber corresponds to the size of case 9, and will serve as support therefore when at the end of the operation the optical fiber will be bonded to the case. Finally, moving means such as electric motors M2 or cylinders V3 allow the optical fiber 11 to be moved rapidly on its support, the accurate movement being provided by the scanners 12 and 14 along the axes Y and X respectively and by a motor M2 along axis Z.

The means for accurate movement used in this apparatus are power galvanometers and, since the extension of the movements required along the three axes does not exceed a millimeter, it is sufficient for these galvanometers to oscillate about their balanced position so that cam 13, which is excentric, or pipet 15 which is supported by one of its ends, is displaced by about 500 microns, which is sufficient for providing positioning scanning. However, the scanners may be replaced by stepper motors provided that the number of steps is sufficient to ensure good positioning accuracy, better than a micron, or provided that the associated mechanical system guarantees that such reliability in positioning is better than a micron.

This summary description of the apparatus which has just been given will now make it easier to understand how reciprocal alignment of the optical fiber of the laser is obtained. The basic step of such positioning is shown in FIG. 4.

It has been stated that the first thing to do is to locate the reciprocal positions of the laser and of the optical fiber with respect to a fixed reference system, then to position in turn the laser and the optical fiber, still with respect to this fixed reference system. Laser 19 is in the present case a ribbon laser which emits light energy through two opposite faces 30 and 31. To identify and locate the front face 30 of the laser the part of the spontaneous light energy of the laser is used which is emitted or reflected in a direction perpendicular to the direction of its main beam, i.e. in direction Y according to the convention which was adopted for location in FIG. 1.

This light radiation 32 is picked up by the microscope objective 5 and is projected on a deflection measuring diode 6+7 such as shown in FIG. 2 or having two faces 33 and 34 such as shown in this FIG. 4. This deflection measuring diode has at its center a neutral region 35. It is the axis defined by the optical axis of the microscope objective 5 and the neutral region 35 of the deflection measurement diode which forms the fixed reference system with respect to which the components of the optical head will be positioned.

In the case shown in FIG. 4, the laser is too advanced with respect to this fixed reference system, and the light radiation 32 is projected on diode 33. By moving the laser, that is by moving it back along axis Z, the radiation 32 will pass through the neutral region 35, then be projected on the diode 34.

Thus, the support for the laser case is driven along the emission axis Z by a stepper motor and an endless screw. When the laser enters the field of the optical system 5, the infrared image of the laser formed on the detector generates an electric signal which is cancelled out when the front emission point of the laser, namely the parasite light emitted by face 30, is centered with respect to the detector in the neutral zone 35. This is what is shown in FIG. 5, it being understood that the distances, in microns, for which the front face 30 of the laser has not reached the origin of the fixed reference system will be considered as negative and the distances corresponding to a position in which the laser has gone beyond this reference system, such as shown in FIG. 4, will be considered as positive. It is therefore, when the signal delivered by the differential detector 33+34 is cancelled out that the laser is correctly positioned.

The magnification of the image forming optical system, i.e. of the microscope objective with large focal length, must be chosen so as to have sufficient search dynamics so that the light emitted by the rear face 31 of the laser does not penetrate into the field of the optical system 5. With a magnification of the order of 20, the search dynamics is sufficient and is typically of the order of 300 to 500 microns.

FIG. 6 shows a partial sectional view of the optical head case, showing the introduction of the fiber in the case and manipulation thereof with respect to the laser.

Laser 19, fixed to its ceramic base 20 in its case 9, being correctly positioned with respect to the fixed reference system, the end of the optical fiber 11, held and manipulated by the gripper 26, is introduced into tube 21 which passes through the wall of case 9, so as to "fly over" the chip of laser 19. Introduction of fiber 11 in tube 21 is facilitated by means of two jaws 23 and 24 described with reference to FIG. 3, these jaws having an end with an opening cone large enough so that introduction of the fiber 11 into this cone raises no problem. In a first stage, gripper 26 is positioned too low with respect to the emission axis Z of the laser, so that, as is shown in FIG. 6, the optical fiber 11 by its free end adjacent the laser, is higher than the laser and flies over it. This is important for preventing, during introduction of fiber 11 into case 9, the end of the fiber from striking the edge of the ceramic substrate 20. The end of fiber 11 is then taken up by a pipet 15, the diagram of which is shown enlarged in FIG. 7. This pipet includes a groove 36 so that it substantially matches the shape of the optical fiber 11 and it is pierced longitudinally by a channel 37 connected to a vacuum pump. Aspiration of fiber 11 by groove 36 is sufficient for handling the fiber with respect the laser 19.

The end of fiber 11 is at this time very much set back with respect to the position of the laser, of the order of a millimeter. Moreover, it is held by pipet 15 above the upper face of the laser at a distance Y of about 100 to 200 microns: it "flies over" the laser.

The fiber is then driven with a lateral reciprocal movement along the axis X, of an amplitude of the order of 400 microns, and it is progressively advanced towards the laser, in a rapid axial movement created by motor M2 and gripper 26. When the fiber flies over the laser it modulates the infrared light of the laser on a position detector 6 in FIG. 2 or 33-34 in FIG. 4, at the time of passing above the emission point of the laser.

The fiber is then moved back slowly, by a slow axial movement along axis Z, and the amplitude of the modulation signal is cancelled out when the end of fiber 11 is slightly set back with respect to the inlet face of the laser, by a known and constant amount. This is what is shown in FIGS. 8 and 9, which show the modulation of the electric signal on the differential detector as a function of the distance from the optical fiber to the emissive face of the laser, when the fiber flies over the laser in FIG. 8, and when the fiber is correctly spaced from the emissive face in FIG. 9. If the distance between the laser and the optical fiber along axis Z is called $Z_{LF}$ and if we consider that Z increases when the laser draws close to the fiber, FIG. 8 shows that if, for example, $Z_{LF} = -20$ microns, the fiber flies over the laser and it modulates the light emitted by the face 30 of the laser, in a lateral reciprocal movement along the X axis, which is communicated thereto by the pipet 15. On the other hand, FIG. 9 corresponds to the case where, with the fiber moved back, the distance $Z_{LF} = +60$ microns means that the fiber is at 60 microns from the front face of the laser and the modulation ceases, or is only very little marked by reflection on the spherical end of the fiber. Instead of detecting the cancelling out of the amplitude of the modulation on the differential detector, the position at which this amplitude crosses a certain threshold may also be detected and the value corresponding for example to $Z_{LF} = 0$ micron may be chosen as threshold value. This is what is shown in FIG. 10: from the time when the threshold is reached, it is sufficient to move the optical fiber back in a slow movement along axis Z by a predetermined distance, for example 60 microns so as to be sure that it is correctly positioned along axis Z with respect to the laser.

With the optical fiber 11 correctly positioned along Z with respect to laser 19, it must then be positioned along X and Y so as to obtain the maximum coupling.

The dynamics of moving the fiber in the plane X-Y, perpendicular to the emission direction Z of the laser, is relatively small of the order of 500 microns. On the other hand, the sensitivity must be less than a micron and a reasonable time for obtaining coupling is of the order of a few seconds.

For moving the fiber in the plane X-Y, the scanners 12 and 14 are used. From a position of fiber 11 which is too high, scanner 12, which controls the position along Y, moves the fiber down a step, while scanner 14, which controls the vibration along the X axis, and which carries pipet 15, causes fiber 11 to scan in front of the laser 19. The downward movement along axis Y continues until the light emitted by the laser is picked up by the optical fiber and detected by the monitoring diode 16.

Coupling along X-Y is then obtained by the combined movements of scanners 12 and 14, driven by a microprocessor, from information obtained from the coupled light signal measured at the other end of the fiber by diode 16. Optimum coupling, not only along Y but also along X, may be obtained by comparison with the threshold value. This is what is shown in FIG. 11 which gives the shape of the electric signal detected by the receiving diode 16, as a function of the position of the optical fiber in a transverse plane with respect to the emission axis of the laser. With the positions along Y or along X plotted as abscissa, and the voltage delivered by diode 16 plotted as ordinates, the signal is in the form of a bell curve and the optimum position may be obtained by measuring the position corresponding to a threshold. If V1 and V2 are the two positions of the fiber, in its displacement movement in front of the laser, corresponding to the predetermined threshold S, the coupling position is (V1+V2)/2 and the electronics associated with the positioning apparatus allow one and/or the other scanner 12 and 14 to be forced into the position (V1+V2)/2.

Once the coupling has been obtained along X-Y, it may be optimized by a slight movement along axis Z, in an interval of the order of 10 microns, so as to improve the optimum position along Z which had been previously determined arbitrarily by moving the end of fiber 11 back by 60 microns with respect to the front face 30 of the laser.

With the fiber henceforth positioned along Z, along Y and along X with respect to the light beam of the laser, it is in a first stage bonded to the ceramic 20 which supports the laser by means of a drop of adhesive, distributed by the syringe 17 which is brought close to the fiber by the actuating cylinder V4. This drop of adhesive is polymerized by an ultraviolet radiation flash.

With the fiber properly speaking fixed to the ceramic 20, the plastic sheath of the fiber is in its turn fixed in the tube 21 which passes through the wall of case 9 by means of another drop of adhesive, delivered by the other syringe 18, positioned by the actuating cylinder V5, and which may also be polymerized by an ultra violet radiation flash.

From this time, support 10 which holds the optical fiber 11, may be withdrawn from the apparatus, the optical head case 9 being held in position 29 which is provided for this purpose in support 10. To finish the optical head it is sufficient to place and seal a cover on case 9.

The apparatus for positioning the optical fiber with respect to a laser, in accordance with the invention, has been described in a relatively concise way. It includes of course devices for acquiring data relative to the position of the moving parts as well as safety devices and the whole of all this data is processed automatically by a microprocessor for controlling the rapid movements and the slow movements and for obtaining positioning with an accuracy better than 0.5 micron in a time of the order of a minute.

To sum up, the method of the invention, includes then the following steps, pre-positioning: positioning of the support plate 10 of the optical fiber 11 and of the support case 9 of laser 19, electric connection of the laser and rapid advance of the case of the laser in the proximity of the fixed reference system 5-6-7, positioning of the fiber in the case by slow advance of the laser case and introduction of the fiber in tube 21 until the end of the fiber arrives in the vicinity of the ceramic 20 which supports the laser, lowering of the gripper 26 and advance of the laser case until the end of the fiber arrives in the vicinity of the laser and is gripped by aspiration by the pipet 15, positioning of the laser along Z: advance of the laser and positioning of the laser in the field of the first face of the differential detector, at more or less 200 microns, then slow advance of the laser until the signal of the differential detector changes sign: the centered position of the laser with respect to the fixed reference system is reached:

positioning of the fiber along Z: rapid advance of the fiber, and setting scanner 14 in vibration along X, then slow advance of the fiber until modulation of the electric signal appears on the differential detector. Moving the fiber back along Z by a known amount, positioning of the optical fiber along X and along Y: horizontal movement along X, communicated to the fiber by the pipet 15 and scanner 14, simultaneously with a step by step downward movement along the axis Y communicated by the scanner 12 and the excentric 13, until the optimum position along X and along Y is reached, this optimum position being detected by the detection diode 16, optimization of the coupling by scanning the previously precentered fiber along X, along Y and along Z, immobilization of the fiber 11 by bonding the fiber itself to the ceramic 20 which supports the laser 19 and by bonding the sheath of the fiber in tube 21 which passes through the case 9 of the laser, removal of the optical head formed and closure of the case by means of a cover.

All such positioning is achieved under the control of an electronic system based on the microprocessor which acquires the positioning data and controls the displacement motors.

The positioning apparatus and method are applied to the rapid and economic construction of fibered optical heads, for the processing of data for professional electronics and telecommunications. They are clearly stated in the following claims.

What is claimed is:

1. A method for reciprocally positioning an optical fiber and a semiconductor laser, the wafer of the laser being mounted in a case without cover and the fiber substantially parallel to the emissive axis of the laser, being introduced into the case through one of its walls, in which process the laser and the fiber are located with respect to a fixed reference system formed by the optical axis common to an image forming optical device and to a differential optical detector which picks up the energy radiated by the laser in a direction perpendicular to the emission axis of the laser.

2. The positioning method as claimed in claim 1, wherein, with a first emissive face of the laser positioned at the origin of the fixed reference system, the end of the fiber introduced into the case is detected by the modulation of the energy picked up by the differential detector when the fiber is situated between the laser and the differential detector, the fiber then being spaced apart from the laser, along the emissive axis, by a known amount until the modulation ceases then is positioned in a transverse plane with respect to the emissive axis by scanning along the two axes in this transverse plane, the fiber and the laser being aligned when the maximum light emitted by the laser and transmitted by the opticle fiber is detected by a detection diode situated at the second end of the optical fiber.

3. An apparatus for the reciprocal positioning of an optical fiber and a semiconductor laser using the method as claimed in claim 2, including:

means forming a fixed reference system, said means being formed by an optical image forming device and a differential optical detector fixed on a rigid frame, mobile means for supporting and holding an open case in position, in which the laser is fixed:

means for providing rapid and slow movements of the laser in its case, along the emissive axis of the laser for positioning the emissive face of the laser at the origin of the fixed reference system, mobile means for supporting and holding an optical fiber in position, means for providing rapid and slow movements of the fiber along the emissive axis of the laser so as to introduce the fiber into the case and to position it between the laser and the differential detector.

two means for finally displacing, in a reciprocal movement, the fiber in a transverse plane with respect to the emissive axis of the laser, means for optically detecting the light emitted by the laser and transmitted by the fiber, mobile means for immobilizing the fiber with respect to the case of the laser, electronic means for acquiring positional data of the fiber and of the laser and for controlling the moving and bonding means.

4. The positioning apparatus as claimed in claim 3, wherein said optical image forming device is a microscope objective with magnification such that it sees only a single emissive face of the laser, called front face, the rear emissive face being out of the field of the objective.

5. The positioning apparatus as claimed in claim 3, wherein the means for holding the case of the laser in position are two jaws actuated by actuating cylinders.

6. The positioning apparatus as claimed in claim 3, wherein the means providing fine movement of the fiber in a plane transversal to the emissive axis of the laser are formed by two scanners, galvanometers or stepper motors, the first scanner, associated with a cam, moving the second scanner along a first axis of the transverse plane, and the second scanner, associated with an arm manipulating fiber, along a second axis of the transverse plane.

7. The positioning apparatus as claimed in claim 3, wherein the arm for moving the fiber is a pipet having a channel connected to a suction pump, the fiber being sucked and held in a groove at the end of the pipet.

8. The positioning apparatus as claimed in claim 3, wherein the means for immobilizing the fiber with respect to the case of the laser are formed by two syringes delivering a microdrop of adhesive on the fiber adjacent the laser and a microdrop of adhesive on the sheath of the fiber, in the passage through the wall of the case, as well as by a device for irradiating the adhesive deposited with ultraviolet rays.

* * * * *